United States Patent
Boone et al.

(10) Patent No.: US 7,288,046 B2
(45) Date of Patent: Oct. 30, 2007

(54) TORQUE CONVERTER SLIP CONTROL FOR MULTI-DISPLACEMENT ENGINE

(75) Inventors: Michael A Boone, Leonard, MI (US); Mark J Duty, Goodrich, MI (US); John S Mitchell, Farmington Hills, MI (US); Gregory M Pannone, Rochester Hills, MI (US); Michael J Prucka, Grass Lake, MI (US); Marc H Sullivan, Southfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 137 days.

(21) Appl. No.: 11/085,640

(22) Filed: Mar. 21, 2005

(65) Prior Publication Data
US 2006/0211539 A1   Sep. 21, 2006

(51) Int. Cl.
*F16H 61/48*   (2006.01)

(52) U.S. Cl. .............................. 477/54; 477/52; 477/53; 477/66; 477/67; 477/68; 477/106

(58) Field of Classification Search ................... 477/52, 477/53, 54, 66, 67, 68, 105, 106
See application file for complete search history.

(56) References Cited

U.S. PATENT DOCUMENTS

| 4,585,101 | A | 4/1986 | Danno |
| 5,374,224 | A | 12/1994 | Huffmaster et al. |
| 5,408,974 | A | 4/1995 | Lipinski et al. |
| 5,568,795 | A | 10/1996 | Robichaux et al. |
| 5,611,754 | A | 3/1997 | Haga et al. |
| 6,311,670 | B1 | 11/2001 | Constancis |
| 6,843,752 | B2 | 1/2005 | Bolander |
| 7,059,998 | B2 * | 6/2006 | Bolander et al. ........... 477/107 |
| 2004/0244744 | A1 | 12/2004 | Falkowski et al. |
| 2004/0244751 | A1 | 12/2004 | Falkowski et al. |

OTHER PUBLICATIONS

Bates, B.; Dosdall, J. M.; and Smith, D. H.; "Variable Displacement by Engine Valve Control," SAE Paper No. 780145 (New York, NY; 1978).

Mueller, Robert S.; and Uitvlugt, Martin W.; "Valve Selector Hardware," SAE Publication No. 780146 (New York, NY; 1978).

(Continued)

*Primary Examiner*—David D. Le
(74) *Attorney, Agent, or Firm*—Thomas A. Jurecko

(57) ABSTRACT

Prior to transitioning a multiple-displacement engine from a full-displacement engine operating mode to a partial-displacement engine operating mode, a base slip rate of a torque converter coupled to the engine engine is increased by a predetermined slip rate offset. The engine is then transitioned to partial-displacement mode upon the earlier of either achieving the desired offset slip rate, or once a maximum time delay has occurred since the slip rate offset was enabled. An offset slip rate is maintained throughout partial-displacement engine operation, and through a transition back to a full-displacement mode. The slip rate offset is removed or disenabled once the engine is again operating in the full-displacement mode. The slip rate offset is either a calibratable constant or is determined as a function of one or more suitable engine or vehicle operating parameters affecting vehicle NVH levels, such as engine speed and vehicle speed.

19 Claims, 2 Drawing Sheets

OTHER PUBLICATIONS

Fukui, Toyoaki; Nakagami, Tatsuro; Endo, Hiroyasu; Katsumoto, Takehiko; and Danno, Yoshiaki; "Mitsubishi Orion-MD—A New Variable Displacement Engine," SAE Paper No. 831007 (New York, NY; 1983).

Hatano, Kiyoshi; Iida, Kazumasa; Higashi, Hirohumi; and Murata, Shinichi; "Development of a New Multi-Mode Variable Valve Timing Engine," SAE Paper No. 930878 (New York, NY; 1993).

McElwee, Mark; and Wakeman, Russell; "A Mechanical Valve System with Variable Lift, Duration, and Phase Using a Moving Pivot," SAE Paper No. 970334 (New York, NY; 1997).

Yacoub, Yasser; and Atkinson, Chris; "Modularity in Spark Ignition Engines: A Review of its Benefits, Implementation and Limitations," SAE Publication No. 982688 (New York, NY; 1998).

Zheng, Quan; "Characterization of the Dynamic Response of a Cylinder Deactivation Valvetrain System," SAE Publication No. 2001-01-0669 (New York, NY; 2001).

Leone, T.G.; and Pozar, M.; "Fuel Economy Benefit of Cylinder Deactivation—Sensitivity to Vehicle Application and Operating Constraints," SAE Paper No. 2001-01-3591 (New York, NY; 2001).

Patton, Kenneth J.; Sullivan, Aaron M.; Rask, Rodney B.; and Theobald, Mark A.; "Aggregating Technologies for Reduced Fuel Consumption: A Review of the Technical Content in the 2002 National Research Council Report on CAFÉ," SAE Paper No. 2002-01-0628 (New York, NY; 2002).

Falkowski, Alan G.; McElwee, Mark R.; and Bonne, Michael A.; "Design and Development of the Daimlerchrysler 5.7l Hemi Engine Multi-Displacement Cylinder Deactivation System," SAE Publication No. 2004-01-2106 (New York, NY, May 7, 2004).

2004 Global Powertrain Congress program, Sep. 28-30, 2004, Ford Conference & Event Center, Dearborn, Michigan, USA (9 pages).

Albertson, William, et al [William Albertson, Thomas Boland, Jia-shium Chen, James Hicks, Gregory P. Matthews, Micke McDonald, Sheldon Plaxton, Allen Rayl, Frederick Rozario], "Displacement on Demand for Improved Fuel Economy Without Compromising Performance in GM's High Value Engines," Powertrain International—2004 Global Powertrain Conference, Saline, Michigan, Sep. 29, 2004.

* cited by examiner

TORQUE CONVERTER SLIP CONTROL FOR MULTI-DISPLACEMENT ENGINE

FIELD OF THE INVENTION

The invention relates generally to multi-displacement internal combustion engines and, more particularly, to methods and computer-executable code for controlling slip in a torque converter coupled to a multi-displacement engine to smooth transitions between full- and partial-displacement engine operating modes.

BACKGROUND OF THE INVENTION

The prior art teaches equipping vehicles with "variable displacement," "displacement on demand," or "multiple displacement" internal combustion engines in which one or more cylinders may be selectively "deactivated," for example, to improve vehicle fuel economy when operating under relatively low-load conditions. Typically, the cylinders are deactivated through use of deactivatable valve train components, such as the deactivating valve lifters as disclosed in U.S. patent publication no. US 2004/0244751 A1, whereby the intake and exhaust valves of each deactivated cylinder remain in their closed positions notwithstanding continued rotation of their driving cams. Combustion gases are thus trapped within each deactivated cylinder, whereupon the deactivated cylinders operate as "air springs" while a corresponding increase in intake manifold pressure operates to reduce engine pumping losses. When vehicle operating conditions are thereafter deemed to require an engine output torque greater than that achievable without the contribution of the deactivated cylinders, as through a heightened torque request from the vehicle operator based upon a detected intake manifold air pressure representing a current engine load, the deactivatable valve train components are returned to their nominal activated state to thereby "reactivate" the deactivated cylinders.

To provide an improved driving experience, the prior art has sought to reduce driver-perceptible engine torque disturbances during mode transitions by adjusting spark timing, throttle position, and fuel before, during, and/or after the transition, until a steady state at the new operating mode has been achieved.

Additionally, if, at the time of a transition from a full-displacement operating mode to a cylinder-deactivation "partial-displacement" operating mode, a vehicle is equipped with a torque converter that is not already operating at a maximum slip rate, the prior art teaches allowing greater torque converter slip during the transition to thereby dampen the torque pulses generated during the transition. After the transition, the slip rate is lessened, for example, to a lockup condition to thereby promote improved vehicle fuel economy in the ensuing partial-displacement mode.

Unfortunately, in some instances, such slip rate reductions after transitioning to a partial-displacement mode undesirably increase vehicle noise, vibration, and harshness (NVH) levels, particularly at lower engine and vehicle speeds, thereby reducing the system's transparency to vehicle passengers.

BRIEF SUMMARY OF THE INVENTION

In accordance with an aspect of the invention, a method for controlling slip in a torque converter coupled to a multi-displacement engine includes enabling a predetermined slip rate offset to a base slip rate when the engine is operating in a full-displacement mode and, after enabling the slip rate offset, transitioning the engine to a partial-displacement mode upon the earlier of (1) achieving a current slip rate equal to the base slip rate plus the slip rate offset, and (2) achieving an elapsed time since enabling that exceeds a predetermined maximum delay. While the invention contemplates use of any suitable maximum delay, in a constructed embodiment, a maximum delay of about 5 seconds ensures a timely transition to partial-displacement mode while otherwise providing a significant time period within which the transmission slip rate can gradually transition to the desired offset base slip rate. Similarly, while the invention contemplates use of any suitable slip rate offset, in a constructed embodiment, the slip rate offset is a calibrated constant having a value that is preferably greater than about 20 RPM and is preferably less than about 100 RPM, with a most preferred value of about 80 RPM. However, the invention contemplates determining the slip rate offset as a function of one or more engine and/or vehicle operating parameters impacting vehicle NVH levels, such as an instantaneous engine speed or an instantaneous vehicle speed.

In accordance with another aspect of the invention, the slip rate offset to the base slip rate is thereafter maintained throughout subsequent engine operation in the partial-displacement mode and through a subsequent transition of the engine back to the full-displacement mode, with the slip rate offset being disenabled only after the transition back to full-displacement engine operation has been completed.

In accordance with yet another aspect of the invention, the method for controlling torque converter slip in a multi-displacement engine further includes waiting a predetermined minimum delay before reenabling the slip rate offset after disenabling, to ensure a stabilization of transmission operation before enabling another torque converter slip rate offset. While the invention contemplates any suitable minimum delay, the minimum delay is preferably not less than about one second.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figure 1:
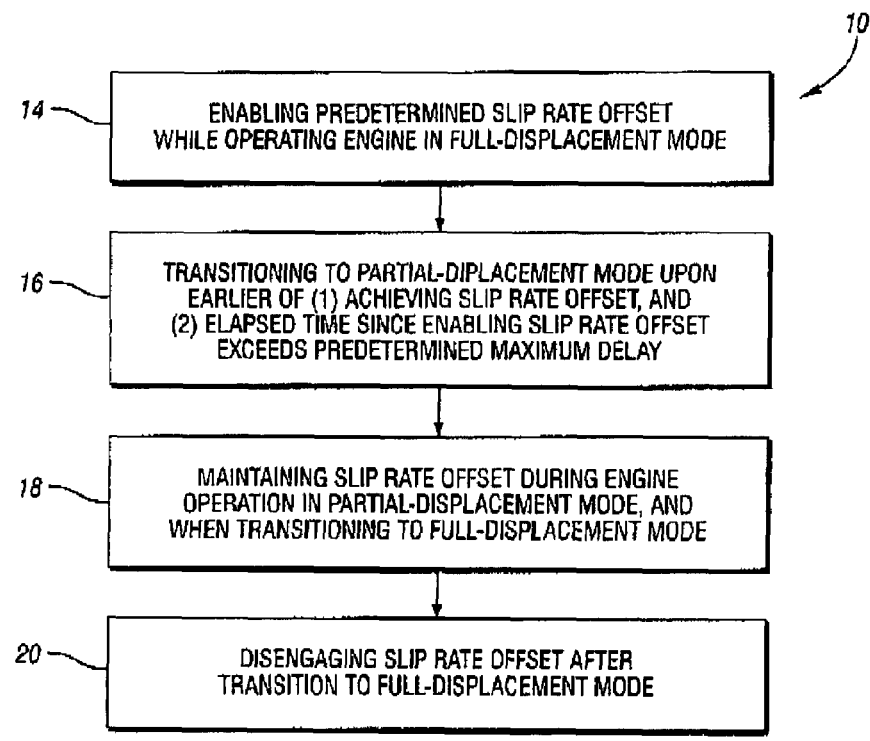
FIG. 1 is a flow chart illustrating the main steps of a method for controlling torque converter slip in response to deactivation and reactivation of several cylinders of a multi-displacement engine, in accordance with the invention.
Figure 2:
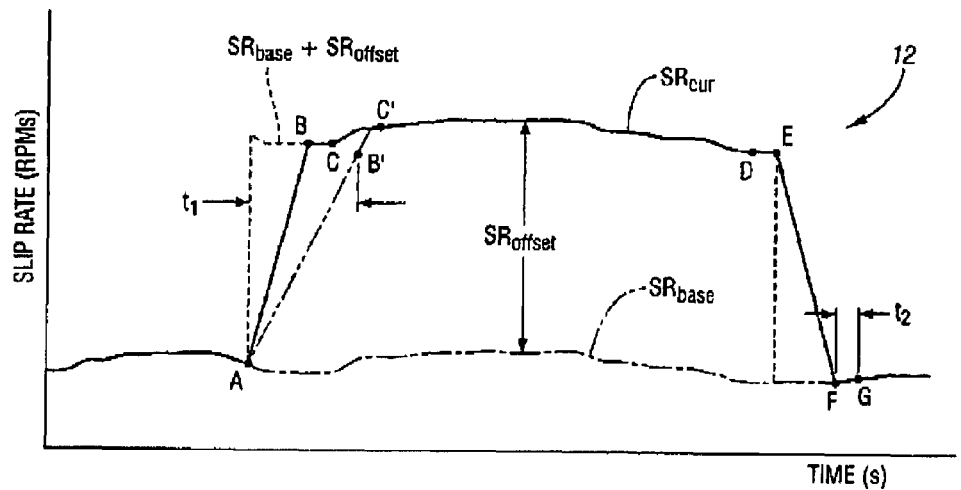
FIG. 2 is an exemplary plot of torque converter slip rate versus time, illustrating a current slip rate $SR_{cur}$ as the engine transitions from a full-displacement mode to a partial-displacement mode, and again back to a full-displacement mode, in accordance with the invention.

A method 10 for controlling slip in a torque converter coupled to a multi-displacement engine is generally illustrated in FIG. 1, while an exemplary plot 12 of torque converter slip rate versus time, illustrating a current torque converter slip rate $SR_{cur}$ as the engine transitions from a full-displacement mode to a partial-displacement mode, and again back to a full-displacement mode, is shown in FIG. 2. While the invention contemplates any suitable hydraulic and/or electromechanical system for deactivating the given cylinder, including deactivatable valve train components, a constructed embodiment features an eight-cylinder engine in which four cylinders are selectively deactivated through use of deactivatable valve lifters as disclosed in U.S. patent publication no. US 2004/0244751 A1, the teachings of which are hereby incorporated by reference.

As seen in FIGS. 1 and 2, the method 10 generally includes enabling, at block 14, a predetermined torque converter slip rate offset before transitioning from a full-displacement engine operating mode to a partial-displacement operating mode. While the slip rate offset is enabled in any suitable manner, by way of example only, in a constructed embodiment, the slip rate offset is enabled by calling for an increase in the base slip rate $SR_{base}$ (itself determined by a suitable transmission controller, not shown) by an amount equal to a predetermined slip rate offset $SR_{offset}$. And, while the invention contemplates implementing the call for the increased torque converter slip rate in any suitable manner, in the constructed embodiment, the resulting instantaneous or current slip rate $SR_{cur}$ (determined by the transmission controller using outputs from suitable crankshaft speed and transmission output shaft speed sensors) advantageously "ramps up" to the desired slip rate, as illustrated in FIG. 2 by both the solid and phantom lines beginning at point A (representing the point in time at which the call for the increased slip rate occurs), to thereby minimize driver-perceptible torque fluctuations.

Also as seen at block 16 of FIG. 1, the method 10 further includes transitioning engine operation from the full-displacement mode to a partial-displacement mode, by deactivating one or more of the engine's deactivatable cylinders, once either the slip rate offset $SR_{offset}$ to the base slip rate $SR_{base}$ is achieved (that is, when the current slip rate $SR_{cur}$ equals the base slip rate $SR_{base}$ plus the slip rate offset $SR_{offset}$) or a maximum predetermined time period $t_1$, as measured from when the slip rate offset $SR_{offset}$ was enabled, has lapsed. Thus, as illustrated in FIG. 2, if the detected or determined current slip rate $SR_{cur}$ equals the base slip rate $SR_{base}$ plus the slip rate offset $SR_{offset}$ before the first timer $t_1$ has run out, as illustrated by point B on the solid line of FIG. 2, the cylinders are then deactivated at point B to achieve the desired partial-displacement engine operating mode at point C on FIG. 2. On the other hand, if the first timer $t_1$ runs out before the transmission controller reports that the current slip rate $SR_{cur}$ equals the base slip rate $SR_{base}$ plus the slip rate offset $SR_{offset}$, as illustrated by point B' on the phantom line of FIG. 2, the transition to the desired partial-displacement engine operating mode is initiated before the current slip rate $SR_{cur}$ equals the base slip rate $SR_{base}$ plus the slip rate offset $SR_{offset}$), with the transition being illustrated as having been completed at point C' of FIG. 2.

As seen at block 18 of FIG. 1, and as illustrated in FIG. 2, once the transition to the partial-displacement mode is completed (at either point C or C' of FIG. 2), the method 10 further includes maintaining the slip rate offset $SR_{offset}$ throughout subsequent engine operation in the partial-displacement mode (from points C or C' to point D of FIG. 2) and, after it is determined that a transition back to full-displacement engine operation is desired, through a transition back to the full-displacement mode by reactivating the deactivated cylinders (from point D to point E of FIG. 2). By way of example only, in the constructed embodiment, a transition back to full-displacement engine operation is desired when a determined engine output torque request exceeds a determined maximum partial-displacement output torque Once engine operation has returned to the full-displacement mode, i.e., the deactivated cylinders have been reactivated, as seen at block 20 of FIG. 1, the method 10 includes disenabling the slip rate offset, for example, by removing the call to the transmission controller to add the final slip rate offset to the base slip rate (also illustrated at point E of FIG. 2). In a constructed embodiment, the final slip rate offset is gradually reduced to zero over a predetermined time to thereby "ramp down" the slip rate offset, thereby minimizing driver-perceptible torque disturbances associated with the removal of the slip rate offset $SR_{offset}$ itself. The current slip rate $SR_{cur}$ thereafter preferably itself transitions or "ramps down" to the base slip rate $SR_{base}$ as illustrated in FIG. 2, becoming equal to the base slip rate $SR_{base}$ at point F of FIG. 2.

In accordance with another feature of the invention, once the current slip rate $SR_{cur}$ returns to the base slip rate $SR_{base}$ after transitioning back to full-displacement engine operation, a second timer $t_2$ begins to run, during which reenablement of the slip rate offset $SR_{offset}$ is inhibited. After the second timer $t_2$ has run for a predetermined minimum time delay that ensures a stabilization of transmission operation, as illustrated at point G of FIG. 2, the reenablement of the slip rate offset $SR_{offset}$ is permitted, whereupon the engine controller can once again call for an offset slip rate during a subsequent transition to partial-displacement engine operating mode.

Figure 3:
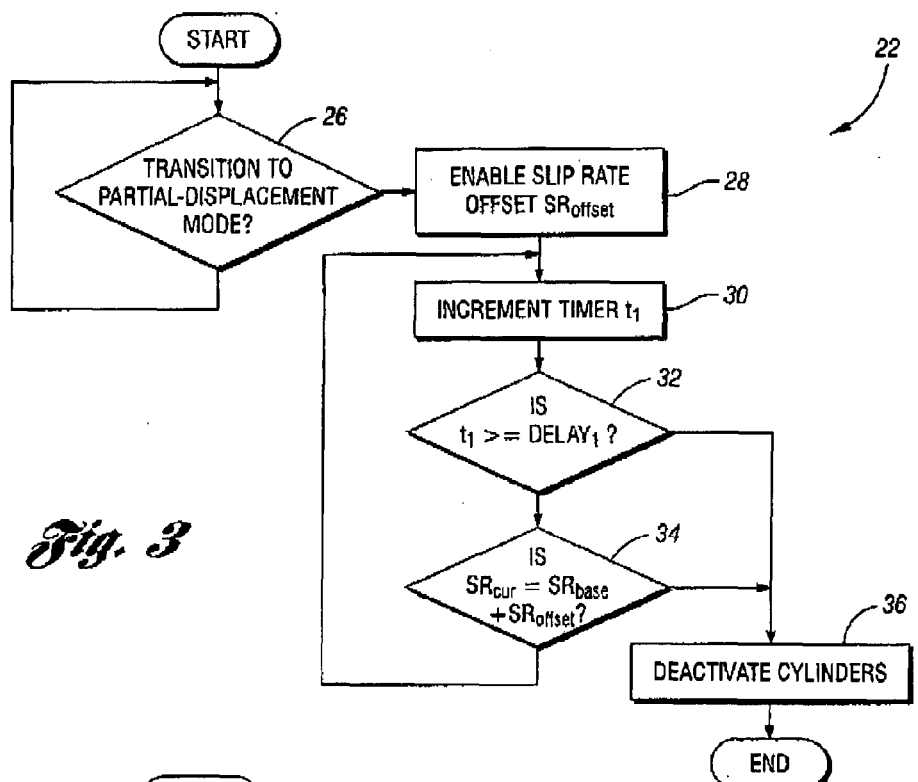
FIG. 3 shows a first exemplary computer-executable process for controlling torque converter slip when transitioning from a full-displacement engine operating condition to a partial-displacement engine operating condition, in accordance with an aspect of the invention.
Figure 4:
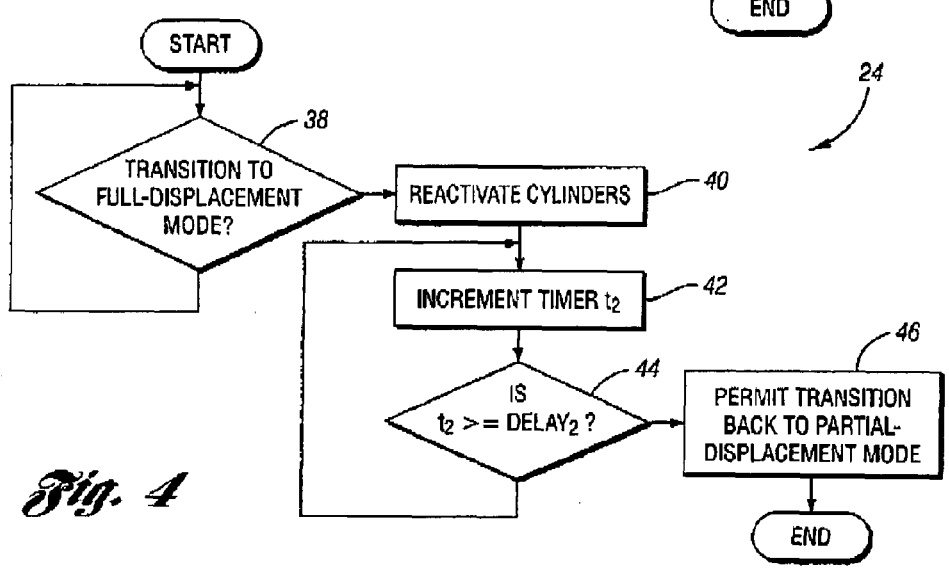
FIG. 4 shows a second exemplary computer-executable process for controlling torque converter slip when transitioning from a partial-displacement mode to a full-displacement mode, in accordance with another aspect of the invention.

A first and second exemplary computer-executable process 22,24 for controlling torque converter slip when transitioning from a full-displacement engine operating condition to a partial-displacement engine operating condition, and back to the full-displacement engine operating condition, are illustrated in FIGS. 3 and 4, respectively. In FIG. 3, the first process 22 includes, after determining whether the engine controller has called for a transition to partial-displacement mode at block 26, enabling the slip rate offset $SR_{offset}$ at block 28, and incrementing a first timer $t_1$ at block 30. If either the first timer $t_1$ has run (by being equal to or greater than a predetermined maximum delay $DELAY_1$, as determined at block 32) or if the current slip rate $SR_{cur}$ now equals the base slip rate $SR_{base}$ plus the slip rate offset $SR_{offset}$ (as determined at block 34), the transition to the desired partial-displacement engine operating mode begins, as with the deactivation of the deactivatable cylinders at block 36.

And, as seen in FIG. 4, in the second process 24, if it is determined that the engine controller has called for a transition back to the full-displacement engine operating mode at block 38, the engine is transitioned back to full-displacement mode at block 40. Once the transition is completed, a second timer $t_2$ is incremented at block 42, whereupon the second timer $t_2$ is compared to a predetermined minimum delay $DELAY_2$ at block 44. If the second timer is equal to or greater than the predetermined minimum delay $DELAY_2$, a subsequent transition back to a partial-displacement engine operating mode will be permitted at block 46.

While the above description constitutes the preferred embodiment, it will be appreciated that the invention is susceptible to modification, variation and change without departing from the proper scope and fair meaning of the subjoined claims. For example, while the disclosed embodiment utilizes a slip rate offset that remains constant, from the initial call (at point A on FIG. 2) through reactivation of the cylinders (completed at point F on FIG. 2), the invention contemplates the use of a suitable minimum (nonzero) slip rate offset during partial-displacement engine operation (after cylinder deactivation is completed at either point C or C') to reduce NVH effects, for example, that is determined as a function of instantaneous engine speed and/or instantaneous vehicle speed.

What is claimed is:

1. A method for controlling slip in a torque converter coupled to a multi-displacement engine, the method comprising:
    enabling a predetermined slip rate offset to a base slip rate when the engine is operating in a full-displacement mode;
    after enabling the slip rate offset, transitioning the engine to a partial-displacement mode upon the earlier of (1) achieving a current slip rate equal to the base slip rate plus the slip rate offset, and (2) achieving an elapsed time since enabling that exceeds a predetermined maximum delay;
    maintaining the slip rate offset to the base slip rate when the engine is subsequently operating in the partial-displacement mode and when transitioning the engine back to the full-displacement mode; and
    disenabling the slip rate offset after transitioning the engine back to the full-displacement mode.

2. The method of claim 1, wherein the slip rate offset is determined based on an instantaneous engine speed.

3. The method of claim 1, wherein the slip rate offset is determined based on an instantaneous vehicle speed.

4. The method of claim 1, wherein the maximum delay is not greater than about 5 seconds.

5. The method of claim 1, wherein the slip rate offset is a calibratable constant.

6. The method of claim 5, wherein the slip rate offset is greater than about 20 RPM.

7. The method of claim 5, wherein slip rate offset is less than about 100 RPM.

8. The method of claim 5, wherein the slip rate offset is equal to about 80 RPM.

9. The method of claim 1, further including waiting a predetermined minimum delay before enabling the slip rate offset after disenabling.

10. The method of claim 9, wherein the minimum delay is not less than about one second.

11. A method for controlling slip in a torque converter coupled to a multi-displacement engine, the method comprising:
    when the engine is operating in a flail-displacement mode and immediately prior to a transition to a partial-displacement engine operating mode, adding a predetermined slip rate offset to a base slip rate;
    maintaining the slip rate offset to the base slip rate when subsequently transitioning the engine to the partial-displacement mode upon the earlier of (1) achieving a current slip rate equal to the base slip rate plus the slip rate offset, and (2) achieving an elapsed time since adding that exceeds a predetermined maximum delay;
    operating the engine in the partial-displacement mode, and
    transitioning the engine back to the full-displacement mode; and
    removing the slip rate offset to the base slip rate after transitioning the engine back to the full-displacement mode.

12. The method of claim 11, wherein the slip rate offset is determined based on an instantaneous engine speed.

13. The method of claim 11, wherein the slip rate offset is determined based on an instantaneous vehicle speed.

14. The method of claim 11, wherein the maximum delay is not greater than about 5 seconds.

15. The method of claim 11, wherein the slip rate offset is a calibratable constant.

16. The method of claim 15, wherein the slip rate offset ranges between about 20 RPM and about 100 RPM.

17. The method of claim 16, wherein the slip rate offset is about 80 RPM.

18. The method of claim 11, further including waiting a predetermined minimum delay before enabling the slip rate offset after disenabling.

19. The method of claim 18, wherein the minimum delay is not less than about one second.

* * * * *

UNITED STATES PATENT AND TRADEMARK OFFICE
CERTIFICATE OF CORRECTION

PATENT NO. : 7,288,046 B2  
APPLICATION NO. : 11/085640  
DATED : October 30, 2007  
INVENTOR(S) : Bonne et al.

Page 1 of 1

It is certified that error appears in the above-identified patent and that said Letters Patent is hereby corrected as shown below:

Title Page:

Item (75) Inventors: Michael A. Boone, Leonard, MI (US)

*should be:*

*Michael A. Bonne, Leonard, MI (US)*

Signed and Sealed this

Fourth Day of March, 2008

JON W. DUDAS  
*Director of the United States Patent and Trademark Office*